United States Patent
Husain et al.

(10) Patent No.: US 12,466,061 B2
(45) Date of Patent: Nov. 11, 2025

(54) MANAGEMENT OF AUTONOMOUS MOBILE DEVICE DISCONNECTIONS

(71) Applicant: Verizon Patent and Licensing Inc., Basking Ridge, NJ (US)

(72) Inventors: Aamir Husain, Jersey City, NJ (US); Derek Wade Ohlarik, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 17/938,516

(22) Filed: Oct. 6, 2022

(65) Prior Publication Data

US 2024/0116175 A1   Apr. 11, 2024

(51) Int. Cl.
*H04L 69/163* (2022.01)
*B25J 9/16* (2006.01)

(52) U.S. Cl.
CPC .......... *B25J 9/1602* (2013.01); *H04L 69/163* (2013.01)

(58) Field of Classification Search
None
See application file for complete search history.

(56) References Cited

U.S. PATENT DOCUMENTS

| | | | |
|---|---|---|---|
| 10,880,412 B1* | 12/2020 | Eng | H04L 67/12 |
| 10,942,514 B2* | 3/2021 | Tai | G08G 5/0069 |
| 2013/0329653 A1* | 12/2013 | Russell, Jr. | H04W 8/20 370/329 |
| 2014/0362765 A1* | 12/2014 | Biswas | H04L 45/24 370/328 |
| 2015/0257081 A1* | 9/2015 | Ramanujan | H04L 45/56 370/329 |
| 2016/0117929 A1* | 4/2016 | Chan | G08G 5/0026 701/3 |
| 2017/0235316 A1* | 8/2017 | Shattil | H04W 4/40 701/3 |
| 2017/0303123 A1* | 10/2017 | Villar | H04L 67/12 |
| 2019/0107846 A1* | 4/2019 | Roy | G08G 5/0052 |
| 2020/0053546 A1* | 2/2020 | Panchal | H04W 72/543 |
| 2020/0186964 A1* | 6/2020 | Lekutai | H04W 4/024 |
| 2020/0383022 A1* | 12/2020 | Shrestha | H04W 36/0064 |
| 2024/0116175 A1* | 4/2024 | Husain | H04W 76/12 |

* cited by examiner

*Primary Examiner* — Truc M Do

(57) ABSTRACT

An autonomous mobile device includes a processor to establish a Transmission Control Protocol Robot Operating System (TCPROS) connection over a Protocol Data Unit (PDU) session between the AMD and a Multi-Access Edge Computing (MEC) device that hosts an AMD controller in a cellular network, from the AMD the AMD controller. The processor may perform a mission in accordance with the mission plan while the AMD is connected to the AMD controller via the TCPROS connection.

20 Claims, 10 Drawing Sheets

US 12,466,061 B2

MANAGEMENT OF AUTONOMOUS MOBILE DEVICE DISCONNECTIONS

BACKGROUND INFORMATION

Autonomous mobile devices (AMDs) include driverless cars, autonomous mobile robots (AMRs), and autonomous aerial vehicles. These devices can sense their environment and function at least partially autonomously and without human intervention. For example, an AMR in an industrial warehouse may move through different aisles to restock empty shelves and prepare packages for shipment.

Some AMDs may maintain communications with a control device over a wireless link. The control device may issue instructions to the AMD, such as a navigation command (e.g., turn right) or a command to move its limbs (e.g., pick up a box), and receive information from the AMR (e.g., a video feed). In some situations, an AMD may receive an instruction to accomplish a mission at specific locations.

DETAILED DESCRIPTION OF EXAMPLE EMBODIMENTS

The following detailed description refers to the accompanying drawings. The same reference numbers in different drawings may identify the same or similar elements. As used herein, the term "autonomous mobile device (AMD) mission" (or simply "mission") may refer to a particular sequence of actions that an AMD is to perform. A "mission plan" may refer to a description of the mission and information that an AMD needs to carry out the mission. As used herein, the term autonomous mobile robot (AMR) may not only refer to a type of robot, but also other types of AMDs (e.g., autonomous vehicles).

As used herein, the term "save point" may refer to a point in a mission plan, a location, or a time at which an AMD saves, to its internal storage, values of all its state variables, a list of tasks it accomplished, a list of paths that it traversed, and/or any other information that the AMD has collected (e.g., video/audio recordings) after the previous save point. As used herein, the term "checkpoint" may refer to a point in a mission plan, a location, or a time at which information saved at all save points since the previous checkpoint is stored at a persistent storage or transferred to another device external to the AMD. Depending on the context, a checkpoint may also refer to a point within a mission plan, a location, or a time at which the AMD reports to another device and/or receives data or command from the other device.

As companies implement automated factories, robust wireless communications become increasingly important for maintaining centralized up-to-date snapshots of the states of AMDs to track their operations. However, in certain situations, an AMD may lose its connection to its controller. For example, an AMD may be unable to receive commands over a wireless link due to an obstruction (e.g., a building).

The systems and methods described herein relate to management of AMD disconnections from AMD controllers (AMDCs). The system permits an AMD disconnected from its AMDC to retrace its travel path to return to the last location at which the AMD communicated with the AMDC and to reconnect to the AMDC. When the AMD reconnects to the AMDC, the AMDC obtains, from the AMD, information that the AMD collected at the time of the disconnection (herein referred to as "disconnection information" or "offline information") and additional information collected between the time of disconnection and at the time of the reconnection. The AMDC may use the information to optimize future navigation of AMDs. The AMDC may also send connectivity alerts and the disconnection information to a system operator or a field engineer. By adapting to AMD disconnections, the AMDC may reduce the downtimes of the AMDs.

Figure 1:
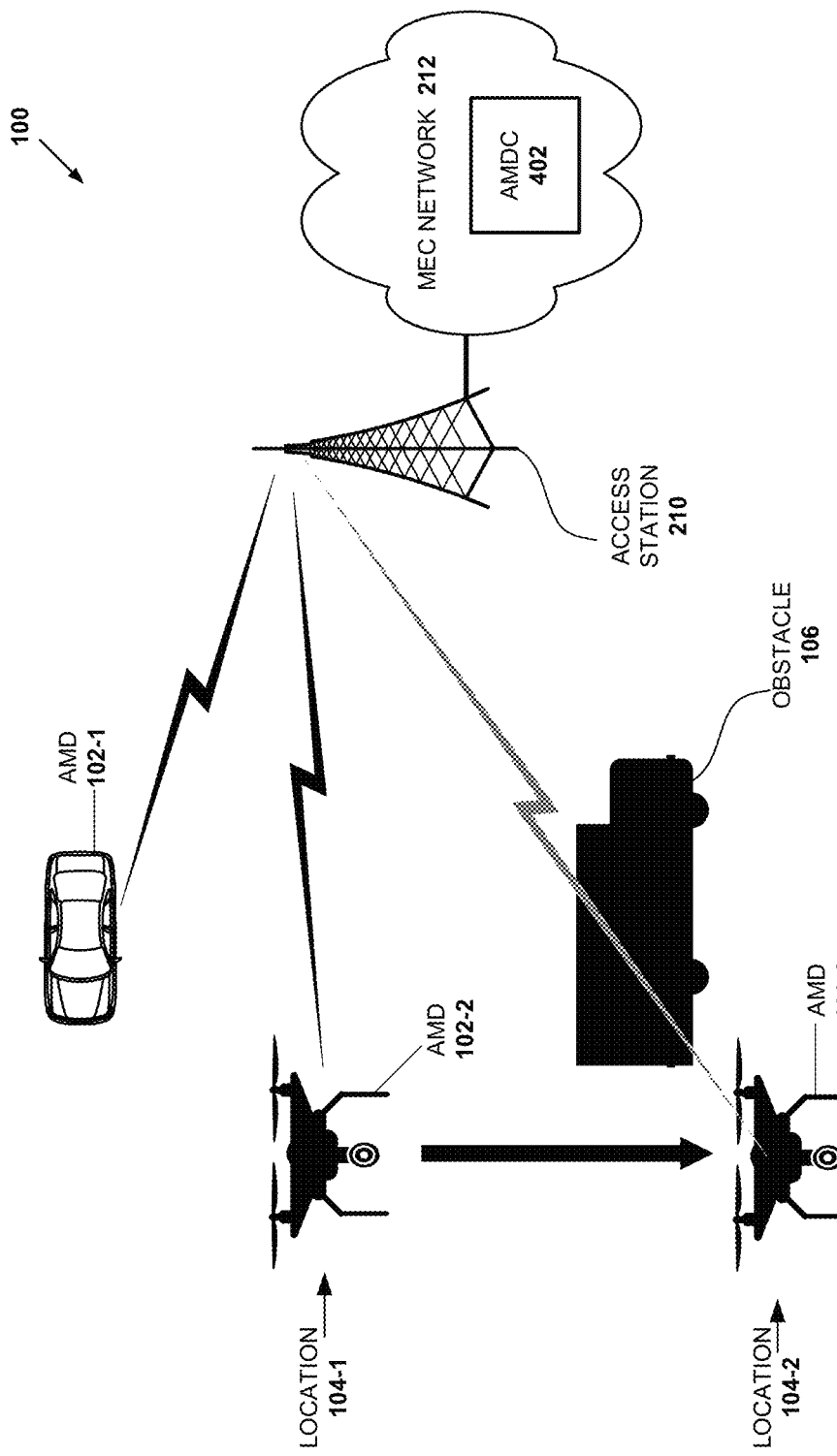
FIG. 1 illustrates an overview of the system described herein.

FIG. 1 illustrates concepts described herein. As shown, a system 100 includes AMD 102-1 (in the form of an autonomous vehicle) and AMD 102-2 (in the form of an AMR). Although AMD 102-1 is shown as an autonomous vehicle and AMD 102-2 is depicted as a drone, AMDs 102-1 and 102-2 may be implemented as other types of AMDs (e.g., a robot in a grocery store, a factory, or a store). AMDs 102-1 and 102-2 (collectively referred to as AMDs 102 and generically as AMD 102) are wirelessly linked to an access station 210 (also referred to as base station 210). Base station 210 is part of a radio access network (RAN). In some implementations, base station 210 may be coupled to an edge network, such as a Multi-access Edge Computing (MEC) network 212. Base station 210 and MEC network 212 are described below in greater detail with reference to FIG. 2. MEC network 212 may host a controller, such as an AMDC 402, for controlling AMDs 102.

In FIG. 1, AMDs 102 may receive mission plans or instructions from the AMDC 402 in MEC network 212. For example, AMD 102-2 may receive a mission plan for AMD 102-2 to deliver a package. In other implementations, AMD 102 may perform various actions without a mission plan. For example, AMD 102-1 may traverse a particular path based on a sequence of commands from AMDC 402 while maintaining a connection to AMDC 402.

Assume that when AMD 102-2 is at location 104-1, AMD 102-2 receives a mission plan from AMDC 402 to deliver a package to a location. Also, assume that as AMD 102-2 move about, AMD 102-2 collects snapshots of its state, including coordinates of its locations, and stores them. These snapshots maybe likened to "breadcrumbs" that AMD 102-2 may use to retrace its path. When AMD 102-2 moves to location 104-2, AMD 102-2 loses its connection to AMDC 402 due to an obstacle 106 in the signal path between the AMD 102-2 and access station 210. The disconnection introduces uncertainty with respect to AMD 102-2 completing its mission. In such a situation, AMD 102-2 and AMDC 402 may perform a disconnection maneuver to reduce the risk of downtime or losing AMD 102.

For example, after AMD 102-2 loses its connection to AMDC 402, AMD 102-2 may record information associated with the disconnection (e.g., a snapshot of AMD state at location 104-2 where AMD 102-2 lost the connection to AMDC 402). Next, AMD 102-2 may retrace its flight path to the last location at which AMD 102-2 has been able to communicate with AMDC 402 and reconnect with AMDC 402. In another example, after AMD 102-2 loses its connection to AMDC 402, AMD 102-2 may proceed to deliver the package.

When AMD 102-2 reconnects with AMDC 402, AMD 102-2 may transmit the recorded disconnection information and/or information that it connected after the disconnection. When AMDC 402 receives the information from AMD 102, AMDC 402 may instruct AMD 102-2 to complete or abort its mission. In some scenarios, AMDC 402 may send alerts to other components of system 100 to initiate an intervention by a field engineer or a system operator. For example, if AMD 102-2 is stuck at a location, AMDC 402 may send a message to a system operator to dispatch a field engineer.

As indicated above, the disconnection information may include coordinates or address of the location at which the AMD 102 lost its connection to AMDC 402. Based on information AMDC 402 has about the location (e.g., a number of times other AMDs 102 have lost connections with AMDC 402 at the location), AMDC 402 may mark the area surrounding the location as a dead zone. For example, when AMDC 402 issues a command to an AMD 102 to travel to a particular destination, AMDC 402 may have the AMD 102 follow a path that excludes the dead zone.

AMDC 402 may use one of many known techniques to designate an area as a dead zone. For example, when AMDC 402 receives a particular number of samples (i.e., coordinates at which AMDs 102 lost their connections), AMDC 402 may use machine learning techniques, such as K-means clustering to classify the location data as a dead zone. Depending on the implementation, AMDC 402 may use different methods or models to identify dead zones, such as artificial neural network models, mean shift clustering, singular value decomposition clustering, etc.

Figure 2:
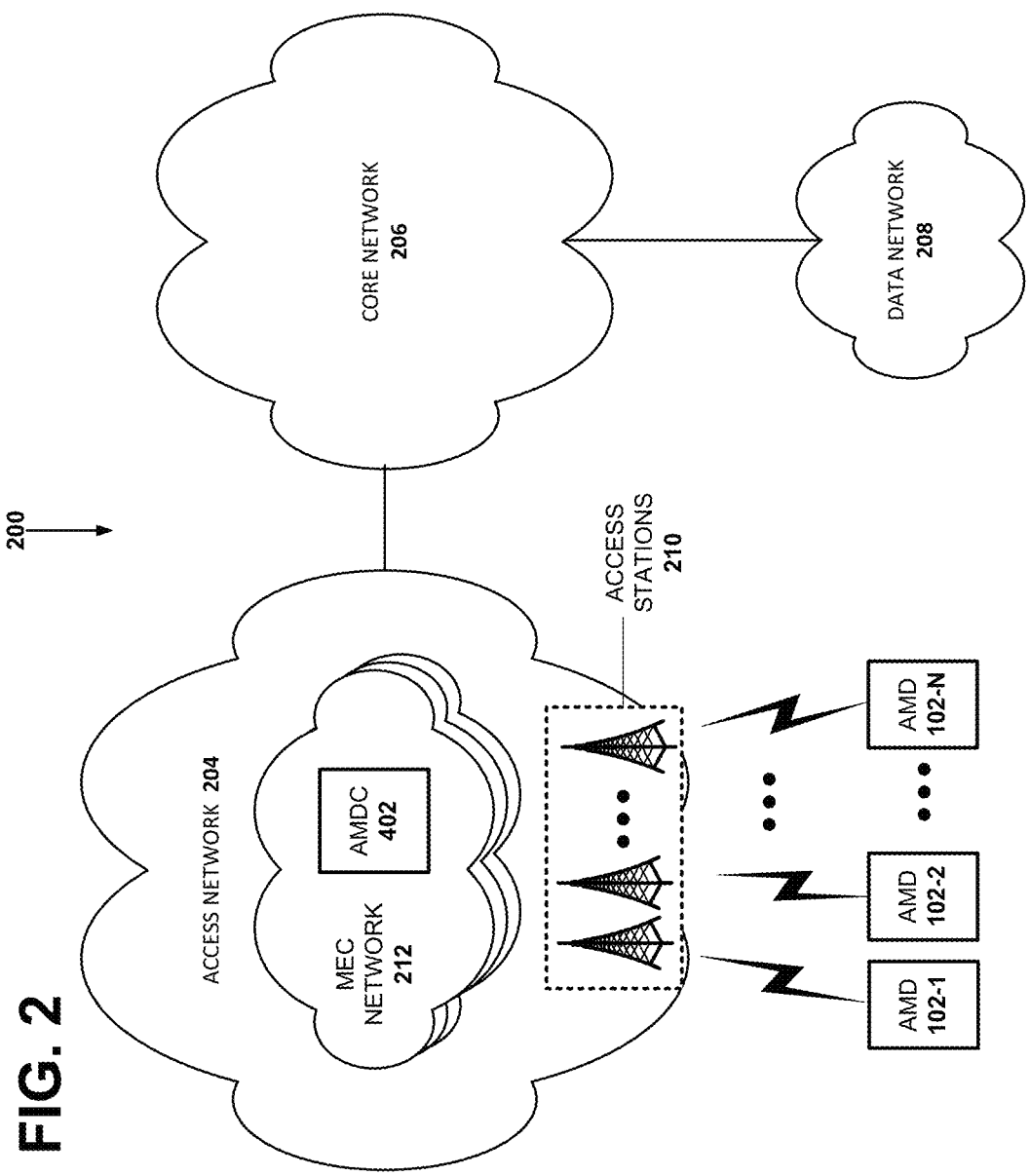
FIG. 2 illustrates an exemplary network environment in which the systems and methods for managing autonomous mobile device (AMD) disconnections may be implemented, according to an implementation.

FIG. 2 illustrates an exemplary network environment 200 in which system 100 may be implemented. As shown, network environment 200 may include AMDs 102 (AMD 102-1, AMD 102-2 . . . ), an access network 204, a core network 206, and a data network 208. AMD 102 may include a wireless communication device capable of autonomous actions or movements. Examples of AMD 102 include: an AMR, an autonomous vehicle, and/or a robot component (e.g., a robotic arm) with wireless communication capability/technology. The communication technology may include 4th Generation (4G) radio access technology (RAT), $5^{Th}$ generation New Radio RAT (5G NR RAT), 6G RAT, etc. In some implementations, AMD 102 may also include: a navigation system; a sensor, such as a pressure sensor or an Internet-of-Things (IoT) device; and/or a wireless Machine-Type-Communication (MTC) device that communicates with other devices over a machine-to-machine (M2M) interface, such as LTE-M or Category M1 (CAT-M1) devices and Narrow Band (NB)-IoT devices.

Access network 204 may allow AMD 102 to access core network 206, data network 208, and/or MEC network 212. To do so, access network 204 may establish and maintain, with participation from AMD 102, an over-the-air channel with AMD 102; and maintain backhaul channels with core network 206 and/or MEC network 212. Access network 204 may relay information through these channels, from AMD 102 to core network 206/data network 208/MEC network 212 and vice versa. Access network 204 may include a Long-term Evolution (LTE) radio network (RAN), a 5G RAN, a 6G RAN, or other advanced radio network. These networks may include many central units (CUs), distributed units (DUs), radio units (RUs), and wireless stations, some of which are illustrated in FIG. 2 as access stations 210 for establishing and maintaining over-the-air channel with AMD 102. Access station 210 may include a 4G, 5G, 6G. or another type of base station (e.g., eNB, gNB, etc.) that comprises one or more radio frequency (RF) transceivers. In some implementations, access station 210 may be part of an evolved Universal Mobile Telecommunications Service (UMTS) Terrestrial Network (eUTRAN).

As further shown, access network 204 may further include one or more Multi-Access Edge Computing networks 212, Each MEC network 212 may include one or more MEC devices. Each MEC device may be coupled to an access station 210 (or other RAN devices such as CU, DU, etc.). Because of its proximity to access station 210 and therefore its proximity to AMDs 102 attached to access station 210 via wireless communication links, the MEC devices may provide services to AMDs 102 with minimal latency. Some of the MEC devices may host AMDC 402 for AMDs 102, although in other implementations, AMDC 402 may be installed on data network 208 and provide services to AMDs 102 therefrom. AMDC 402 is described below in greater detail with reference to FIG. 4.

Core network 206 may manage communication sessions of subscribers connecting to core network 206 via access network 204. For example, core network 206 may establish an Internet Protocol (IP) connection between AMDs 102 and data network 208. In some implementations, core network 206 may include a 5G core network. In other implementations, core network 206 may include a 4G core network (e.g., an evolved packet core (EPC) network) or another type of core network.

The components of core network 206 may be implemented as dedicated hardware components or as virtualized functions implemented on top of a common shared physical infrastructure using Software Defined Networking (SDN). For example, an SDN controller may implement one or more of the components of core network 206 using an adapter implementing a Virtual Network Function (VNF) virtual machine, a container, an event driven server-less architecture interface, and/or another type of SDN component. The common shared physical infrastructure may be implemented using one or more devices 300 (described below with reference to FIG. 3) in a cloud computing center associated with core network 206. In some implementations, the virtualized network components may be used to implement one or more network slices—logical networks to provide particular services, applications, or a set of services at particular Quality of Service (QoS) levels.

Data network 208 may include one or more networks connected to core network 206. In some implementations, a particular data network 208 may be associated with a data network name (DNN) in 5G and/or an Access Point Name (APN) in 4G, and an AMD 102 may request a connection to data network 208 using a DNN or APN. Data network 208 may include, and/or be connected to and enable communication with, a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also simply referred to as application), such as an AMDC. An application may provide services for a program or an application running on AMD 102 and may establish communication sessions with AMD 102 via core network 206. In some implementations, data network 208 may be implemented as a network slice.

Depending on the implementation, network environment 200 may include additional networks and components than those illustrated in FIG. 2. For clarity, FIG. 2 does not show all components that may be included in network environment 200 (e.g., routers, bridges, wireless access point, additional UE devices, switches, etc.).

Figure 3:
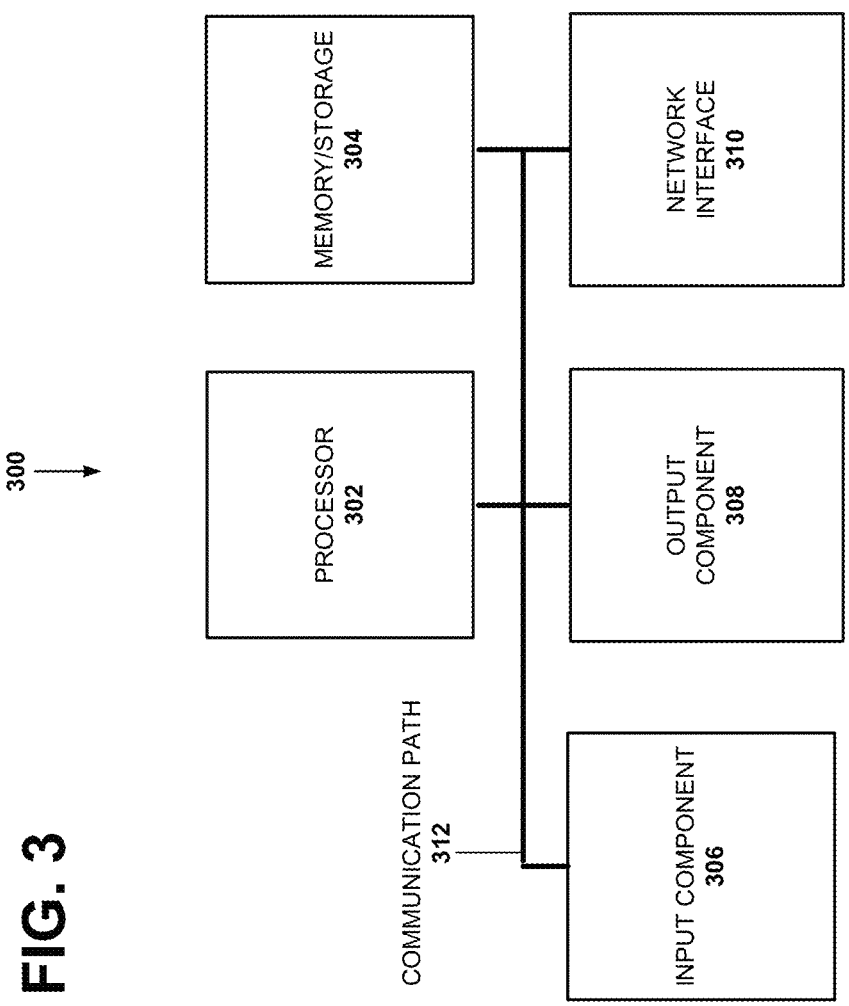
FIG. 3 depicts exemplary components of an exemplary network device according to an implementation.

FIG. 3 depicts exemplary components of an exemplary network device 300. Network device 300 may correspond to or be included in any of the devices and/or components illustrated in FIGS. 1 and 2 (e.g., AMD 102, access network 204, core network 206, data network 208, MEC devices in MEC network 212, AMDC 402, etc.). In some implementations, network devices 300 may be part of a hardware network layer on top of which other network layers may be implemented (e.g., network slices).

As shown, network device 300 may include a processor 302, memory/storage 304, input component 306, output component 308, network interface 308, and communication path 312. In different implementations, network device 300 may include additional, fewer, different, or different arrangement of components than the ones illustrated in FIG. 3. For example, network device 300 may include line cards, switch fabrics, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 300 and/or executing programs/instructions. Depending on the implementation, network device 300 may include more than one processor 302 for performing different tasks, such as, for example, tasks associated with communications, robot arm movement, navigation, etc.

Memory/storage 304 may include static memory, such as read only memory (ROM), and/or dynamic memory, such as random access memory (RAM), or onboard cache, for storing data and machine-readable instructions (e.g., programs, scripts, etc.). Memory/storage 304 may also include an optical disk, a magnetic disk, a solid state disk, a holographic versatile disk (HVD), a digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories. Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from network device 300. Input/output components 306 and 308 may include a display screen, a keyboard, a mouse, a speaker, a microphone, a camera (e.g., a video camera), a DVD reader, USB lines, and/or other types of components for obtaining, from physical events or phenomena, signals that pertain to network device 300. When network device 300 is implemented as or includes an AMD 102, input component 306 and output component 308 may include sensors (e.g., an infrared sensor, an acoustic sensor, an accelerometer, a GPS receiver, a gyroscope sensor, a barometric sensor, etc.), power supplies, actuators (e.g., motors), and/or components associated with AMD mobility (e.g., propellers, wheels, limbs, caterpillars, etc.).

Network interface 310 may include a transceiver (e.g., a transmitter and a receiver) for network device 310 to communicate with other devices and/or systems. For example, via network interface 310, network device 300 may communicate over a network, such as the Internet, an intranet, a terrestrial wireless network (e.g., a WLAN, WIFI, WIMAX, etc.), a satellite-based network, optical network, MEC network 212, etc. Network interface 310 may include a modem, an Ethernet interface to a LAN, and/or an interface for connecting network device 300 to other devices (e.g., a Bluetooth interface).

Communication path or bus 312 may provide an interface through which components of network device 300 can communicate with one another.

Network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform one or more of the processes that are described herein.

Figure 4:
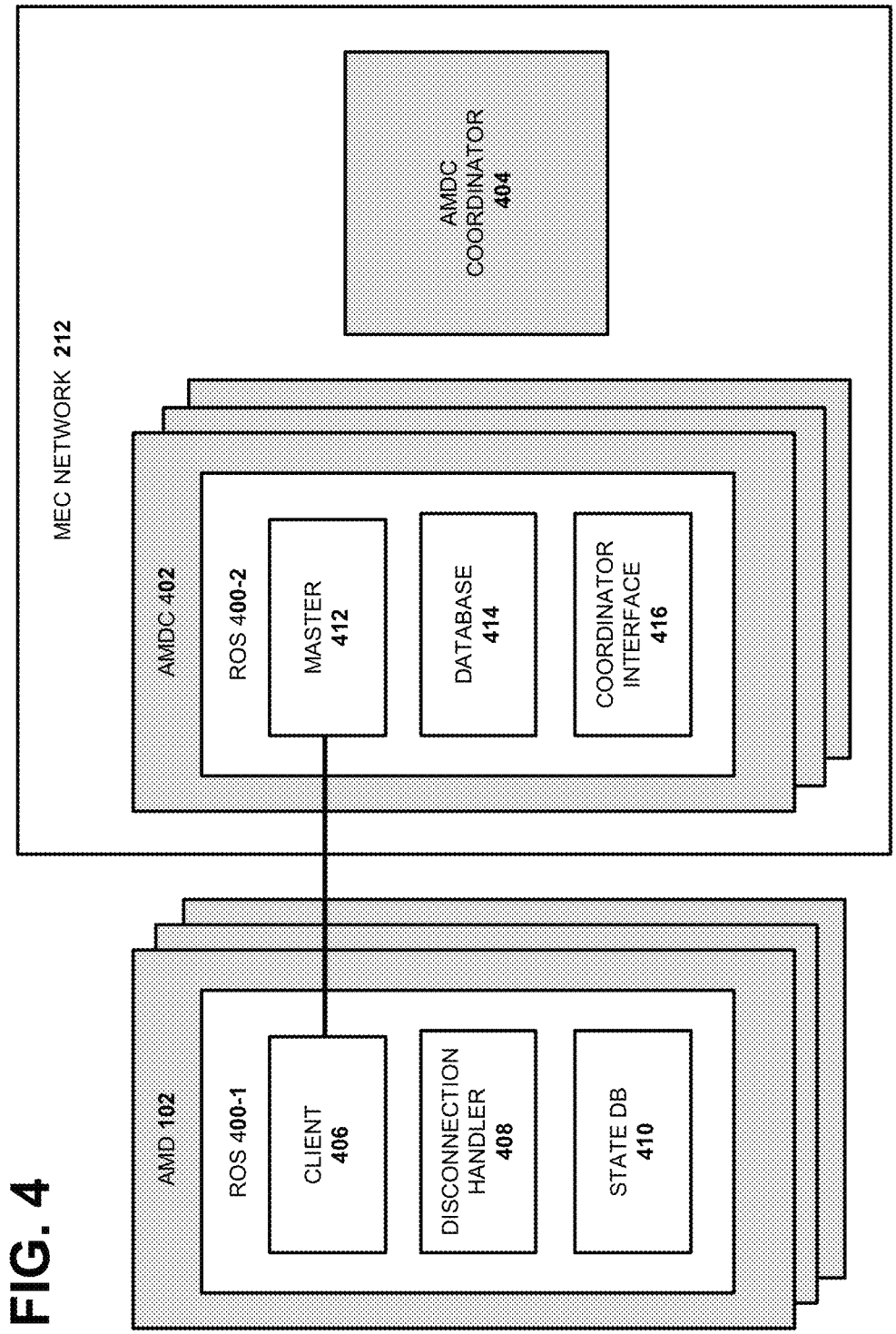
FIG. 4 depicts exemplary logical components of an AMD and an AMD controller (AMDC) according to an implementation.

FIG. 4 depicts exemplary logical components of AMD 102 and an AMDC 402 according to an implementation. As shown, a system includes AMD 102, AMDC 402, and an AMDC coordinator 404, of which AMDC 402 and AMDC coordinator 404 are included in or installed on MEC network 212. Depending on the implementation, system 400 may include additional, fewer, different, or a different arrangement of components than those illustrated in FIG. 4. For example, in one implementation, AMDC 402 or AMDC coordinator 404 may be installed on devices in data network 208.

AMD 102 and AMDC 402 may include a Robot Operating System (ROS) 400-1 and 400-2, respectively. A network of interconnected ROSs 400 (also referred to as a ROS network 400) or ROS nodes (components running ROSs 400) may allow the ROS nodes (e.g., the AMDs 102 and AMDC 402) to communicate with one another over a particular communication protocol, such as a Transmission Control Protocol ROS (TCPROS). The TCPROS connection may be established over a lower layer session, such as a Protocol Data Unit (PDU) session established over access network 204 and/or core network 206.

Because a TCPROS permits exchange of data in accordance with a publisher-subscriber model, any ROS node (e.g., AMD 102 or AMDC 402) may subscribe or publish to any topic (e.g., a virtual billboard to which messages can be sent for publication) that is visible to the node. For example, AMD 102 may send a message that includes disconnection information (e.g., information that AMD 102 obtains when AMD 102 becomes disconnected from AMDC 402) to a topic over ROS network 400.

Referring to FIG. 4, AMD 102 includes a client 406, a disconnection handler 408, and a state database (DB) 410 in addition to ROS 400-1 described above. Client 406 may include a program for controlling AMD 102 or interacting with AMDC 402. When AMD 102 is not connected to AMDC 402, client 406 may act as a local master for AMD 102 and drive AMD behavior. In contrast, when AMD 102 is connected to AMDC 402, client 406 may receive commands and/or services from AMDC 402 and drive AMD 102 in accordance with the commands form AMDC 402.

In some implementations, client 406 may receive a map and/or a mission plan from AMDC 402 and coordinate with AMDC 402 to carry out the mission. Upon receiving a map from AMDC 402, client 406 may generate additional map layer that tracks non-stationary objects that AMD 102 detects, such as a vehicle, pedestrians, and/or other semi-permanent obstacles not indicated on the map received from AMDC 402. Client 406 may make changes or adjustments to its paths or the mission based on the generated map layer (e.g., determine a new path to avoid a moving obstacle).

AMD 102 may begin the mission at a scheduled time and/or when AMD 102 receives a start signal from AMDC 402. As AMD 402 performs each of its tasks, client 406 may record a snapshot of state information associated with AMD 102 (also referred to as "state snapshot") in state DB 410 at specified save points and send the recorded information to AMDC 402 at checkpoints. If AMD 102 is forced to deviate from its mission plan, client 406 may take a corrective action. For example, if AMD 102 loses its communication link with AMDC 402, client 406 may invoke disconnection handler 408. In another example, if AMD 102 collides with a moving obstacle and is spun about, client 406 may reorient AMD 102 in accordance with the mission plan. In yet another example, if AMD 102 encounters a roadblock and takes a detour, AMD 102 may enter a charging station to obtain additional energy to complete its mission.

In some implementations, client 406 may not receive a mission plan from AMDC 402. Rather, client 406 may have AMD 102 follow individual commands that AMDC 402 issues in sequence, such as a command to move AMD 102 from one location to another. The commands may have been input by a human operator at AMDC 402 via a user interface.

Disconnection handler 408 may perform actions that are associated with loss of communication with AMDC 402. For example, assume that AMD 102 records its state information at the start of its mission and/or send the state information to AMDC 402. When a disconnection occurs, disconnection handler 408 may cause AMD 102 to perform tasks to reestablish its communication with AMDC 402 and transmit the disconnection information to AMDC 402. Exemplary processes that are associated with AMD 102 handling its communications with AMDC 402 after a disconnection are described below with reference to FIGS. 5, 6A, 6B, and 7.

State DB 410 may store snapshots of AMD state information. Typically, after client 406 or disconnection handler 408 records a state snapshot in state DB 410, client 406 or disconnection handler 408 sends the state snapshot to AMDC 402. However, if AMD 102 loses its connection to AMDC 402 before AMD 102 can transmit the snapshot to AMDC 402, client 506 or disconnection handler 408 may send the information to AMDC 402 when AMD 102 reestablishes its connection to AMDC 402. AMD 102 may send the state snapshot together with the disconnection information and/or any additional state information that AMD 102 has accumulated since the disconnection.

Examples of the state information include: an indication of the amount of energy that AMD 102 has left in reserve (e.g., battery); an indication of whether, the rate of energy consumption and/or a time when AMD 102's energy maybe depleted; an indication of AMD 102's location (e.g., coordinates, a longitude and a latitude, etc.); an indication of the velocity of AMD 102; indications of environmental conditions (e.g., wind speed, precipitation, etc.); a list of completed tasks or actions; etc.

As noted previously, state DB 410 includes snapshots of AMD states at various save points and at locations where AMD 102 lost its connection to AMDC 402. Accordingly, when AMDC 402 obtains the full contents of state DB 410 from AMD 102 (either at a checkpoint or at a point when AMD 102 is able to establish a connection with AMDC 402), AMDC 402 may be able to trace all paths that AMD 102 travelled after the loss of the connection and before the reestablishment of the connection.

Referring again to FIG. 4, AMDC 402 may include a master 412, a database 416, and a coordinator interface 418. Master 412 may manage one or more AMDs 102. Example management tasks may include: generating mission plans for AMDs 102; sending mission plans to AMDs 102; directing, instructing, or coordinating with each AMD 102 to perform a particular task; tracking AMDs 102; receiving state snapshots from AMDs 102 at checkpoints; updating maps that are associated with AMDs 102 or missions based on information from AMDs 102; alerting or dispatching a field engineer or a system operator when an AMD 102 encounters an event from which AMD 102 cannot recover; determining the type and the amount of resources to allocate for tasks that need to be executed by AMDs 102 based on the information provided by AMDs 102; and allocating the resources to AMDs 102.

Master 412 may use state snapshots from AMDs 102 to create an internal heat maps of areas that AMDs 102 may avoid. With each publication of disconnection information from AMDs 102, master 412 may discern a pattern that emerge from the disconnections near or at the same location. When the number of snapshots from AMDs 102 associated with disconnections around a given area reaches a threshold (e.g., a number that indicates a particular level of statistical significance), master 412 may designate, on the internal heat map, a dead zone corresponding to the area. AMDC 402 may use one of many known techniques to designate dead zones. For example, master 412 may apply various machine learning techniques, such as K-means clustering to classify an area as a dead zone. Depending on the implementation, master 412 402 may use different methods to train machine learning models to determine dead zones, such as artificial neural network models, mean shift clustering, singular value decomposition clustering, etc. Master 412 may use the heat map to generate maps that are distributed to AMDs 102. On the distributed maps, dead zones appear as ordinary obstacles that AMDs 102 may avoid or pass through without communicating with AMDC 402.

Master 412 may generate maps for AMDs 102 in layers. Each layer may indicate a particular type of obstacle. For example, a first layer of a map may indicate roads, streets, etc. A second layer may indicate dead zones. A third layer may indicate a non-permanent obstacles. Yet another layer may indicate weather conditions. Each of the layers may also indicate the cost of navigating through or around a particular obstacle. Master 412 may use the map, with all its layers, to plan missions, including travel paths, for AMDs 102.

By placing marking that represent obstacles on different map layers, master 412 may treat each obstacle type that belongs to a particular layer in a manner different from other obstacle types in computing the cost of traversing a particular route. For example, a map layer that indicates dead zones may be treated differently from a layer that indicates weather conditions, road conditions, etc. Some layers may include markings that represent non-permanent obstacles. Master 412 may remove or clear such markings from the map when master 412 detects that the obstacle no longer at the location. Master 412 may update the map as master 412 receives state snapshots from AMDs 102. Master 412 may use the updates to optimize AMD routes.

Database 414 may include AMD state snapshots obtained from AMDs 102, maps that include map layers, and mission plans. In some implementations, database 414 may also include registration information for each AMD 102 that attaches to AMDC 402. Coordinator interface 418 may permit AMDC 402 to communicate with AMDC coordinator 404 and operate as part of in a network of AMDCs 402. For example, coordinator interface 416 may permit AMDC 402 or an AMD 102 managed by the AMDC 402 to communicate, via AMDC coordinator 404, with another AMDC 402 or another AMD 102 managed by the other AMDC 402. In another example, during a handoff of AMD 102 from one base station 210 to another base station 210 (and therefore during the handoff of the MD 102 from the AMDC 402 corresponding to the base station 210 to the AMDC 402 corresponding to the other base station 210), AMDC 402 may transfer, via coordinator interface 416 and AMDC coordinator 404, the state snapshots of the AMD 102 to the other AMDC 402.

AMDC coordinator 404 (also referred to as an orchestrator) may manage one or more AMDCs 402 in MEC network 212. AMDC coordinator 404 may ensure that the namespace of each of AMDC 402 is unique under a single global namespace and that there is no name collision. Thus, an AMD 102 that registers with one AMDC 402 can be distinguished from another AMDC 402 registered at a different AMDC 402 even if the local names of the AMDs 102 at the corresponding AMDCs 402 are the same.

In some implementations, AMDC coordinator 404 may permit AMDCs 402 to niter-operate. For example, AMDC coordinator 404 may enable a transfer of AMD state information and context from one AMDC 402 to another AMDC 402 during the handoff of the AMD 102 between the AMDCs 402. to another AMDC 402. For example, assume that AMD 102 is managed by a first AMDC 402 operating in an area in New York. When the AMD 102 moves to another area in which AMDs 102 are managed by a second AMDC 402, AMDC coordinator 404 may transfer the AMD state information and its context (e.g., mission plans, maps, etc.) from the first AMDC 402 to the second AMDC 404. Such transfers may permit AMDs 102 to complete a mission which requires AMDs 102 to communicate with multiple AMDCs 402. For example, assume that an AMD 102 has a mission to deliver a package from New York to California. To accomplish the mission, the AMD 102 may need to interact with many regional AMDC 402, with each regional AMDC 402 controlling AMDs 102 in a particular area. The communication may permit transfers of AMD state information from one AMDC 402 to another AMDC 402. As noted above, the state information may include, for the AMD 102, the mission plan, the state snapshots obtained during the mission, the location, the save points, its energy levels (e.g., battery), indications of whether the AMD 102 is in need of maintenance, etc.

AMDC coordinator 404 may interface with an orchestrator that manages MEC clusters or MEC networks 212. The interface may permit AMDC coordinator 404 to be notified, by the orchestrator, of a handover from an AMD 102 from one MEC device to another MEC device or from one MEC network 212 to another MEC network 212. Upon receipt of a handover notification, AMDC coordinator 404 may perform, as described above, any transfer of state information associated with the AMD 102 handed over from one MEC network 212 to another MEC network.

As indicated above, when AMD 102 becomes disconnected from AMDC 402, AMD 102 and AMDC 402 may participate in a set of processes to ensure continued operation of the AMD 102 without significant downtime. The processes entail actions that an AMD 102 and AMDC 402 may take when AMD 102 becomes disconnected from AMDC 402. Examples of such processes are discussed below with reference to FIGS. 5, 6A, 6B, and 7. These processes may be performed by devices 300 that implement AMD 102 and/or AMDC 402, with processor 302 executing or performing logic of the components illustrated in FIG. 4.

Figure 5:
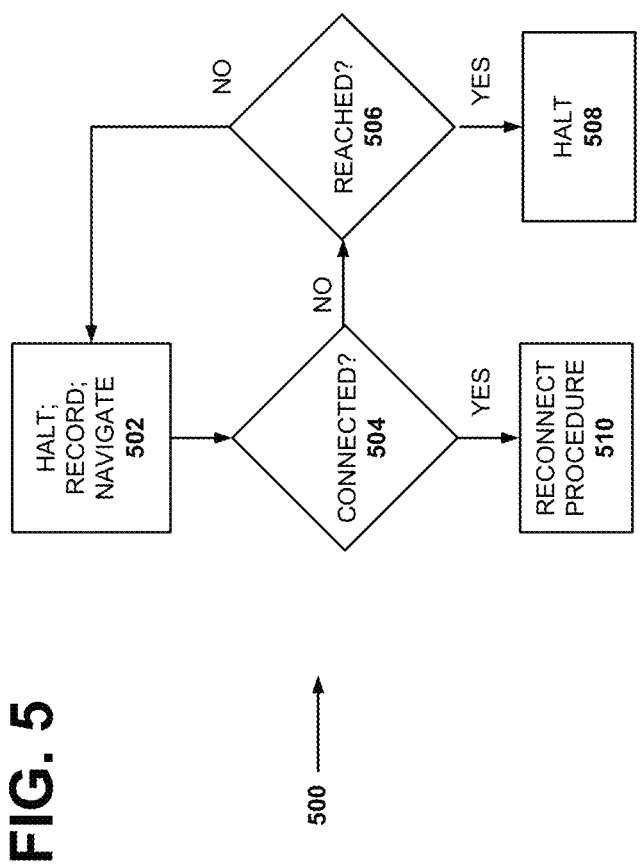
FIG. 5 is a flow diagram of an exemplary process that is associated with an AMD that loses its connection to an AMDC, according to an implementation.

FIG. 5 is a flow diagram of an exemplary process 500 that is associated with AMD 102 that loses its connection to AMDC 402, according to an implementation. Assume AMD 102 has just lost its connection (such as a TCPROS connection) to AMDC 402. The loss may be due to an obstacle, network congestion, network device malfunction, breakdown of the underlying lower layer connection (e.g., the PDU connection between AMD 102 and the device that hosts AMDC 402), etc.

As shown, process 500 may include AMD 102 halting its mission and recording its state information and other information, collectively referred to as disconnection information. That is, AMD 102 may take a snapshot of its state information. AMD 10-2 may take snapshots of its state at regular time intervals or at various points on its path, even though AMD 102 is not at a particular save point identified in its mission plan. A series of snapshots of the AMD state may later be used like "breadcrumbs" for AMD 102 to retrace its path.

After the recording, AMD 102 may plan its next course of action, such as waiting for the network to recover from a temporary outage, determine a navigation path to a next destination on its mission plan (to recover its connection to AMDC 402 as its moves toward the next destination), etc. Assume that AMD 102 is unable to recover its connection (e.g., both the TCPROS connection and the underlying PDU session from AMD 102 to the host of the AMDC 402) to AMDC 402. Accordingly, AMD 102 decides on a flight path to the last known location at which AMD 102 had been communicating with AMDC 402. AMD 102 then navigates to the last known location at which AMD 102 had communications with AMDC 402 (block 502). In retracing its steps, AMD 102 may use the snapshots of its state like "breadcrumbs." That is, AMD 102 may move to the location at which it took its snapshot.

When AMD 102 arrives at the location, AMD 102 attempts to connect to AMDC 402 and determines whether AMD 102 is connected to the AMDC 402 (block 504). That is, AMD 102 determines whether AMD 102 is able to reestablish its connection to the AMDC 402.

At block 504, if AMD 102 determines that AMD 102 is connected to AMDC 402 (block 504: YES) via, for example, a TCPROS connection (along with its underlying PDU session), AMD 102 may perform a reconnection procedure (block 510)—the reconnection procedure for AMD 102 is described below with reference to FIG. 6A. On the other hand, if AMD 102 determines that it is not connected to AMDC 402 (block 504: NO), AMD 102 may determine whether it has reached the starting location associated with the mission (block 506) by using the snapshots that AMD 102 generated along its travel path. If AMD 102 determines that it has reached the starting location (block 506: YES), AMD 102 may halt its operation (block 508). In some implementations, AMD 102 may continue to transmit signals so that a system operator or another AMD 102 (e.g., a rescue robot) can locate AMD 102. If AMD 102 determines that it is not at the starting point (block 506: NO), AMD 102 may return to block 502 to perform the actions associated with block 502.

Figure 6A:
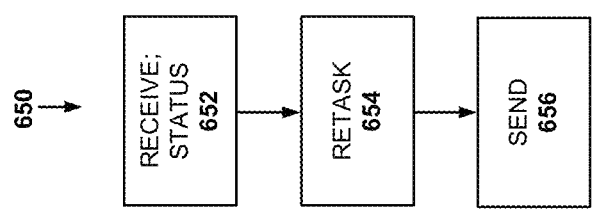
FIG. 6A is a flow diagram of an exemplary process that is associated with an AMD that reconnects with an AMDC after the AMD loses its connection to the AMDC, according to an implementation.

FIG. 6A is a flow diagram of an exemplary process 600 that is associated with AMD 102 reconnecting to AMDC 402 after AMD 102 loses its connection to AMDC 402, according to an implementation. As shown, after AMD 102 reconnects with AMDC 402 (e.g., reestablish a TCPROS connection and the underlying lower layer connections), AMD 102 records its state snapshot (block 602). Next, AMD 102 sends a set of snapshots that AMD 102 has accumulated since AND 102 transmitted its last snapshot to AMDC 402, including the disconnection information (block 604). Thereafter, AMD 102 may wait for further instructions, an updated mission plan, and/or an updated map from AMDC 402 (block 606). The instruction may indicate, for example, AMD 102 to proceed with its current mission, skip a particular task, recalculate its travel paths and the mission, return to the starting point, wait for a system operator, wait for a rescue robot, etc.

Figure 6B:
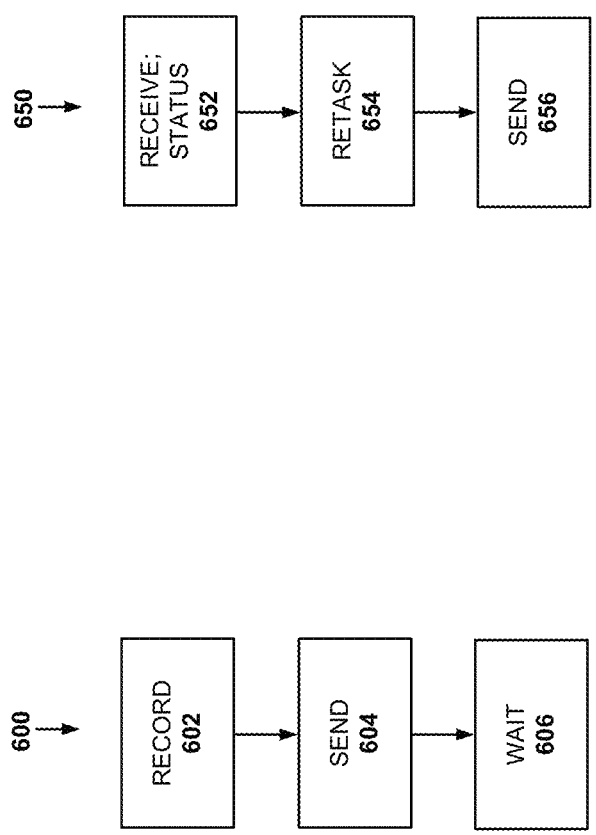
FIG. 6B is a flow diagram of an exemplary process that is associated with an AMDC that reconnects with an AMD after the AMD loses its connection to the AMDC, according to an implementation.

FIG. 6B is a flow diagram of an exemplary process 650 that is associated with AMDC 402 reconnecting with the AMD 102 after AMD 102 loses its connection to AMDC 402, according to an implementation. As shown, process 650 may include, upon AMD 102 reconnecting with AMDC 402, AMDC 402 receiving the disconnection information, state snapshots from AMD 102, etc. (block 652). The received snapshots may include snapshots and data that AMD 102 accumulated since AMD 102 provided its last snapshot and data to AMDC 402. In addition, AMDC 402 may set the status of AMD 102 (in its database) as "connected" (block 652).

Process 650 may further include AMDC 402 re-tasking AMD 102 (block 654). The re-tasking may include, for example, updating the mission plan for AMD 102, generating an updated map for AMD 102 (e.g., one that establishes new dead zones based on the information provided by AMDs 102). After the re-tasking, AMDC 402 may send the updated mission plan, instructions, and/or an updated map to AMD 102 (block 656). For example, AMDC 402 may instruct AMD 102 to wait (e.g., for a system operator), to travel to another location, or to continue its mission.

Figure 7:
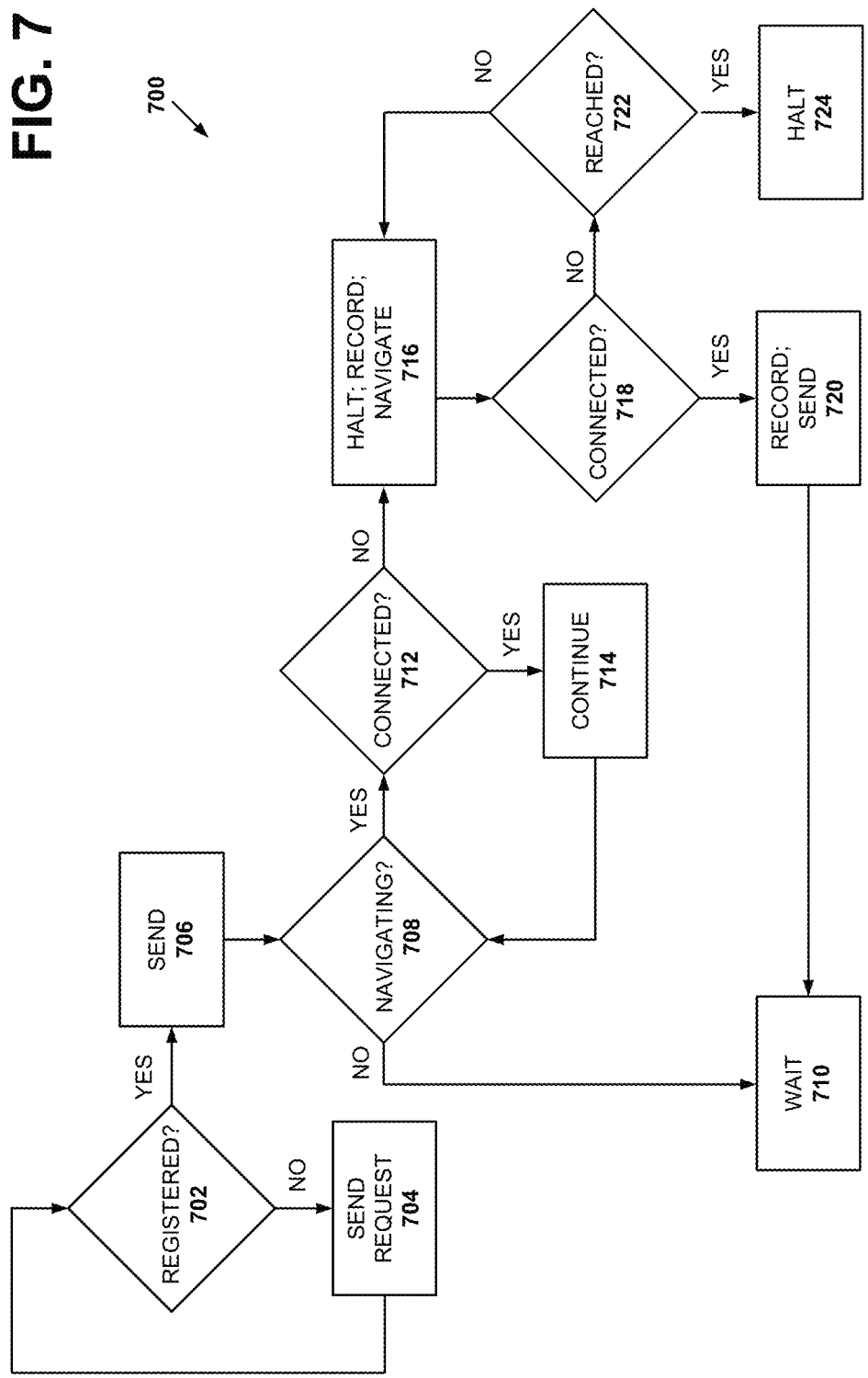
FIG. 7 is a flow diagram of an exemplary process that is associated with an AMD that loses its connection to an AMDC during a mission, according to an implementation.

FIG. 7 is a flow diagram of an exemplary process 700 that is associated with AMD 102 that loses its connection to AMDC 402 during a mission, according to an implementation. Process 700 includes actions similar to those described above for processes 500, 600, and 650. Assume that AMD 102 becomes attached to access network 204; and that AMD 102 attempts to register with core network 206, access network 204, and/or AMDC 402. As shown, process 700 may include AMD 102 determining whether it is registered with core network 206, access network 204, and/or AMDC 402 (block 702). If AMD 102 registers with core network 206 and/or access network 204, core network 206 and/or access network 204 may provide part of the registration information to AMDC 402; and permit AMDC 402 and AMD 102 to obtain information needed by AMDC 402 and AMD 102 for their communications. At block 702, if AMD 102 determines that it is not registered (block 702: NO), AMD 102 may resend its registration request to core network 206, access network 204, and/or AMDC 402 (block 704) and then return to block 702. If AMD 102 is registered at core network 206, access network 204, and/or AMDC 402 (block 702: YES), AMD 102 and AMDC 402 may establish a session. AMDC 402 may forward a mission plan and/or a map to AMD 102 over the connection (block 706).

Process 700 may further include AMD 102 determining whether it is navigating or proceeding in accordance with its mission plan (block 708). If AMD 102 is unable to move or proceed with its mission plan (block 708: NO), AMD 102 may remain at the current location and wait for either a system operator or a rescue robot (block 710). If AMD 102 determines that it is navigating or is able to proceed in accordance with its mission plan (block 708: YES), AMD 102 may determine whether it is connected to AMDC 402 (block 712). If it is connected to AMDC 402 (block 712: YES), AMD 102 may continue with its mission or continue its navigation (block 714). Process 700 may then return to block 708. At block 712, if AMD 102 determines that it is not connected to AMDC 402 (block 712: NO), process 700 may proceed to block 716.

At block 716, AMD 102 may halt or pause its mission (if needed) and record its state information as disconnection information. AMD 102 may record the state information even if AMD 102 is not at a particular save point identified in its mission plan. After the recording, AMD 102 may determine its next course of action, such as waiting for the network to recover from a temporary outage, navigate to a next destination on its mission plan (e.g., to recover its connection to AMDC 402 as its moves toward the next destination), perform its next scheduled task in its mission plan, etc. If AMD 102 is unable to recover its connection to AMDC 402. AMD 102 may determine a travel path to the last known location at which AMD 102 had been communicating with AMDC 402.

Still referring to block 716, AMD 102 may navigate to the last known location at which AMD 102 had communications with AMDC 402. When AMD 102 arrives at the location, AMD 102 may attempt to connect to AMDC 402 and then determine whether AMD 102 is connected to AMDC 402 (block 718). If AMD 102 determines that AMD 102 is connected to AMDC 402 (block 718: YES), AMD 102 may perform a reconnection procedure at blocks 720 and 710. These are described further below. On the other hand, if AMD 102 determines that it is not connected to AMDC 402 (block 718: NO), AMD 102 may determine whether it has reached the starting location associated with the mission (block 722). If AMD 102 determines that it has reached the starting location (block 722: YES), AMD 102 may halt its operation (block 724). In some implementations, AMD 102 may continue to transmit signals so that a system operator or another AMD 102 (e.g., a rescue robot) can locate the AMD 102. Referring back to block 722, if AMD 102 determines that it is not at the starting point (block 722: NO), AMD 102 may return to block 716 to perform the actions associated with the disconnection.

At noted above, at block 720, AMD 102 may perform its reconnection procedure. For example, after AMD 102 reconnects with AMDC 402, AMD 102 may record its state snapshot (block 720). Next, AMD 102 sends the disconnection information and a set of snapshots that AMD 102 has accumulated since it transmitted the last snapshot to AMDC 402 (block 720). Thereafter, AMD 102 may wait for further instructions and/or an updated map from AMDC 402 (block 710). The instruction may request, for example, AMD 102 to proceed with its current mission, skip a particular task, recalculate its travel paths and the mission, return to the starting point, wait for a system operator, wait for a rescue robot, etc.

Figure 8:
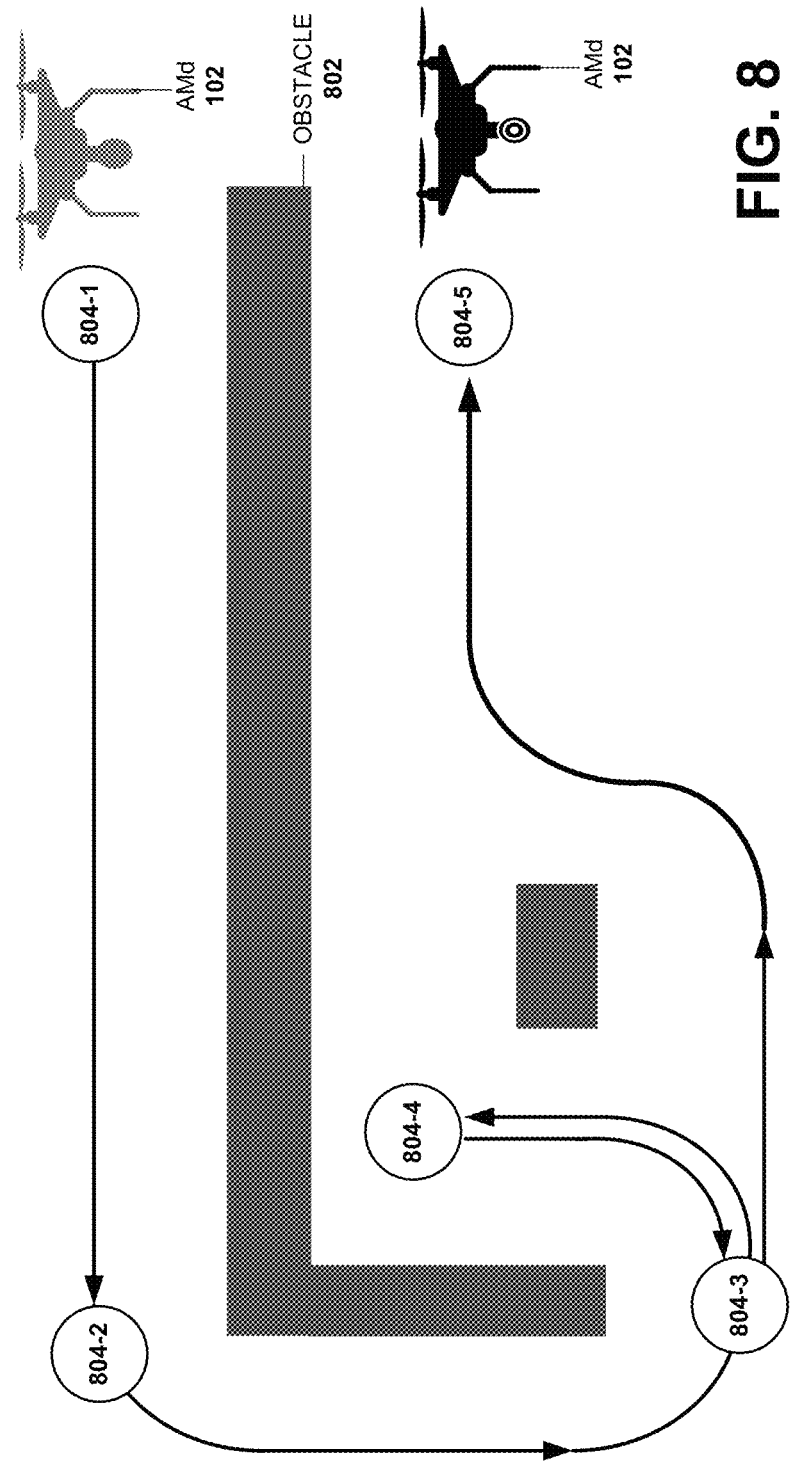
FIG. 8 depicts an exemplary travel path of an AMD on a mission, according to an implementation.

FIG. 8 depicts an exemplary travel path of AMD 102 on a mission, according to an implementation. As shown, AMD 102 may begin its mission at checkpoint 804-1 after receiving its mission plan and/or a map. AMD 102 may travel from checkpoint 804-1 to checkpoint 804-2 and then to checkpoint 804-3. At each checkpoint 804, AMD 102 may take a snapshot of its state and transmit the state snapshot to AMDC 402 (not shown).

Assume that AMD 102 arrives at location 804-4 and loses its connection to AMDC 402. When AMD 102 determines that it has lost its connection to AMDC 402, AMD 102 obtains and stores disconnection information. Next, AMD 102 determines its next course of action. In this example, assume that AMD 102 decides to retrace its travel path to checkpoint 804-3, where it sent its last snapshot to AMDC 402.

When AMD 102 returns to checkpoint 804-3, AMD 102 attempts to reconnect to AMDC 402 and determines whether it has successfully reconnected to AMDC 402. Assuming that AMD 102 reestablished its connection with AMDC 402, AMD 102 records a snapshot of its state. Next, AMD 102 sends the disconnection information obtained at checkpoint 804-4 and the latest snapshot of its state at checkpoint 804-3 to AMDC 402. When AMDC 402 receives the disconnection information and the snapshot, AMDC 402 may store the received information in database 414. Furthermore, AMDC 402 may use the information to identify a dead zone. In the example of FIG. 8, AMDC 402 determines that the disconnection from the AMD 102 at location 804-4 was due to a temporary network outage. AMDC 402 then forwards its instruction to AMD 102 to proceed with the current mission. When AMD 102 receives the instruction from AMDC 102, AMD 102 travels to its destination 804-5, where AMD 102 records its last snapshot for the mission and transmits the snapshot to AMDC 402. AMDC 402 may process the information received from AMD 102 to plan next missions for its AMDs 102, update the maps, etc.

When AMD 102 communicates with AMDC 402, AMD 102 relies on lower level communication channels that core network 206 provides between AMD 102 and AMDC 402. For example, when AMD 102 connects to AMDC 402, core network 206 may provide for establishment of a Protocol Data Unit (PDU) session between AMD 102 and MEC network 212 in which AMDC 402 resides. AMD 102 and AMDC 402 may then exchange messages over the PDU session. Once AMD 102 connects to AMDC 402, core network 206 may continue to perform many function to manage and maintain the connection between AMD 102 and AMDC 402.

Figure 9:
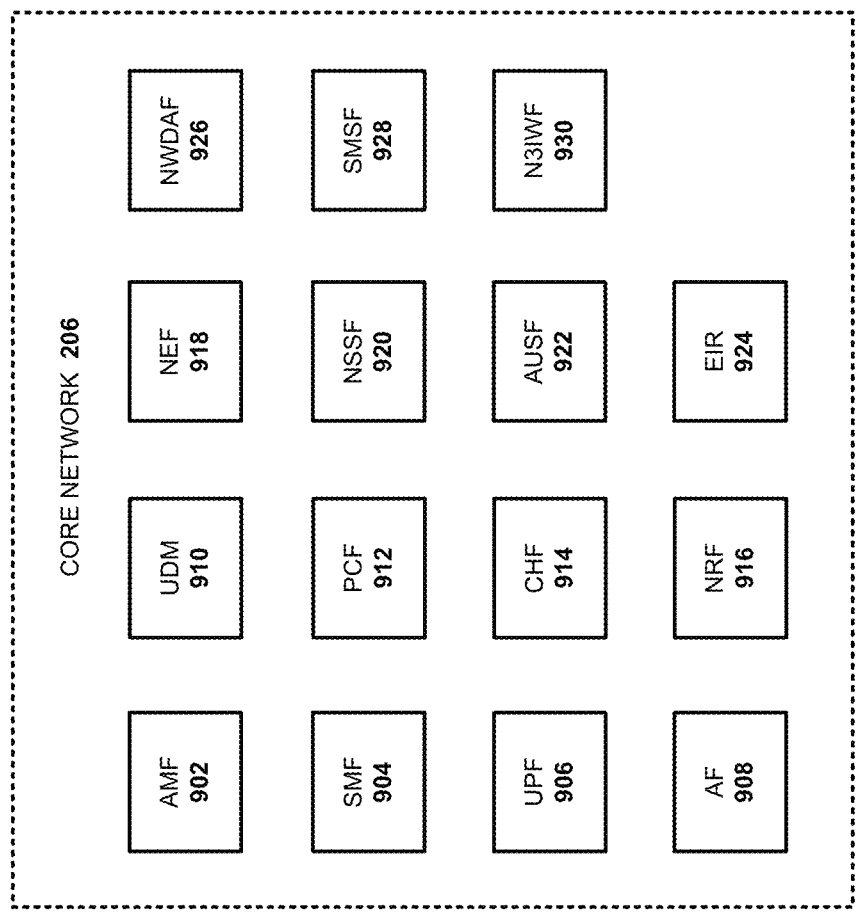
FIG. 9 shows exemplary components of a core network when the core network is implemented as a Fifth Generation (5G) core network, according to an implementation.

FIG. 9 shows exemplary components of a core network 206 when core network 206 is implemented as a 5G core network, according to an implementation. As shown, core network 206 may include an Access and Mobility Management Function (AMF) 902, a Session Management Function (SMF) 904, a user Plane Function (UPF) 906, an Application Function (AF) 908, a Unified Data Management (UDM) 910, a Policy Control Function (PCF) 912, a Charging Function (CHF) 914, a Network Repository Function (NRF)) 916, a Network Exposure Function (NEF) 918, a Network Slice Selection Function (NSSF) 920, an Authentication Server Function (AUSF) 922, an 5G-Equipment Identity Register (EIR) 924, a Network Data Analytics Function (NWDAF) 926, a Short Message Service Function (SMSF) 928, and a Non-$3^{rd}$ Generation Partnership Project Interworking Function (N3IWF) 930. Each of components 902-930 may include network device 300 or be implemented on one or more network devices 300. Depending on the implementation, core network 210 may include additional, fewer, and/or different 5G core network components than those illustrated in FIG. 9.

AMF 902 may perform registration management, connection management, reachability management, mobility management, lawful intercepts, Short Message Service (SMS) transport between AMD 102 and SMSF 928, session management messages transport between UE device 110 and SMF 904, access authentication and authorization, location services management, functionality to support non-3GPP access networks, and/or other types of management processes.

SMF 904 may perform session establishment, session modification, and/or session release, perform IP address allocation and management, perform Dynamic Host Configuration Protocol (DHCP) functions, perform selection and control of UPF 906, configure traffic steering at UPF 906 to guide the traffic to the correct destinations, terminate interfaces toward PCF 912, perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data.

UPF 906 may maintain an anchor point for intra/inter-RAT mobility, maintain an external PDU point of interconnect to a particular data network (e.g., data network 208), perform packet routing and forwarding, perform the user plane part of policy rule enforcement, perform packet inspection, perform lawful intercept, perform traffic usage reporting, perform Quality of Service (QoS) handling in the user plane, perform uplink traffic verification, perform transport level packet marking, perform downlink packet buffering, forward an "end marker" to a RAN node (e.g., gNB), and/or perform other types of user plane processes.

AF 908 may provide services associated with a particular application, such as, for example, an application for influencing traffic routing, an application for accessing NEF 918, an application for interacting with a policy framework for policy control, and/or other types of applications.

UDM 910 may maintain subscription information for ADMs 102, manage subscriptions, generate authentication credentials, handle user identification, perform access authorization based on subscription data, perform network function registration management, maintain service and/or session continuity by maintaining assignment of SMF 904 for ongoing sessions, support SMS delivery, support lawful intercept functionality, and/or perform other processes associated with managing user data.

PCF 912 may support policies to control network behavior, provide policy rules to control plane functions (e.g., to SMF 904), access subscription information relevant to policy decisions, perform policy decisions, and/or perform other types of processes associated with policy enforcement. CHF 914 may perform charging and/or billing functions for core network 206. For example, CHF 914 may generate a charging record for AMD 102 based on data flow information associated with AMD 102.

NRF 916 may support a service discovery function and maintain profiles of available network function (NF) instances and their supported services. An NF profile may include, for example, an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information.

NEF 918 may expose capabilities and events to other NFs, including third party NFs, AFs, edge computing NFs, and/or other types of NFs. Furthermore, NEF 918 may secure provisioning of information from external applications to core network 206, translate information between core network 206 and devices/networks external to core network 206, support a Packet Flow Description (PFD) function, and/or perform other types of network exposure functions.

NSSF 920 may select a set of network slice instances to serve a particular AMD 102, determine network slice selection assistance information (NSSAI) or a Single-NSSAI (S-NSSA), identify a particular AMF 220 to serve a particular AMD 102, and/or perform other types of processing associated with network slice selection or management.

AUSF 922 may perform authentication. For example, AUSF 922 may implement an Extensible Authentication Protocol (EAP) authentication server and may store authentication keys for AMD 102. EIR 924 may authenticate a particular AMD 102 based on AMD identity, such as a Permanent Equipment Identifier (PEI). For example, EIR 924 may check to determine if a PEI is identified in a blacklist.

NWDAF 926 may collect analytics information associated with radio access network 120 and/or core network 206. For example, NWDAF 926 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 928 may perform SMS services for AMD 102. N3IWF 930 may interconnect to a non-3GPP access device, such as, for example, a WIFI Access Point. N3IWF 930 may facilitate handovers for AMD 102 between access network 204 and the non-3GPP access device.

Figure 10:
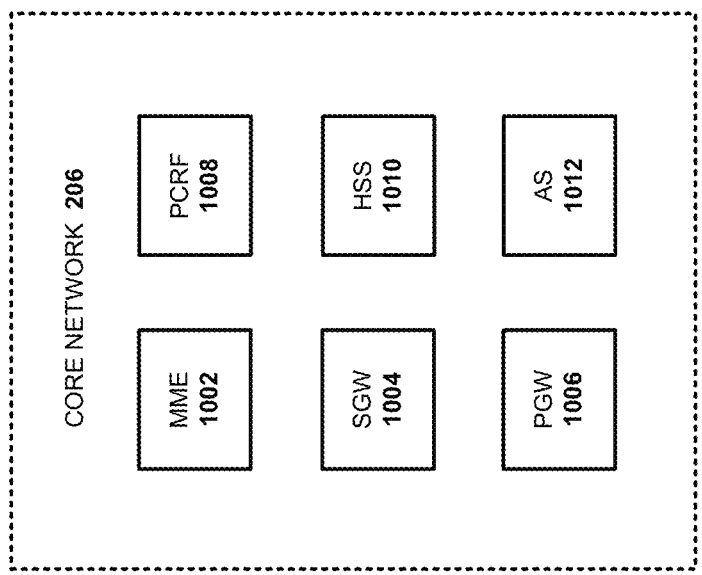
FIG. 10 shows exemplary components of a core network when the core network is implemented as a Fourth Generation (4G) network, according to an implementation.

FIG. 10 shows exemplary components of a core network when the core network is implemented as a Fourth Generation (4G) network, such as an LTE core network, according to an implementation. As shown, core network 206 may include a Mobility Management Entity (MME) 1002, Session Gateway (SGW) 1004, a Packet Data Network Gateway (PGW) 1006, a Policy and Charging Rules Function (PCRF) 1008, a Home Subscriber Server (HSS) 1010, and an Application Server (AS) 1012. Depending on the implementation, core network 206 may include additional, fewer, or different 4G core network components than those illustrated in FIG. 10.

MME 1002 may implement control plane processing for core network 206. For example, MME 1002 may manage the mobility of AMD 102, implement tracking and paging procedures for AMD 102, activate and deactivate bearers for AMD 102, authenticate a user of AMD 102, and/or interface to non-LTE radio access networks. A bearer may represent a logical channel with particular QoS requirements. MME 1002 may also select a particular SGW 1004 for a particular AMD 102.

SGW 1004 may provide an access point to and from AMD 102, may handle forwarding of data packets for AMD 102, and may act as a local anchor point during handover procedures between different base stations 210. PGW 1006 may function as a gateway to an IP network. PGW 1006 may include a PGW-C for managing control plane functions associated with communication sessions and a PGW User Plane Function (PGW-U) for managing the user plane associated with the communication sessions. A particular PGW-C may be part of a set of components that include multiple PGW-Cs addressable via a single domain name. The PGW-Cs may be stateless with respect to session data and session data for sessions managed by the PGW-Cs may be stored in a session database shared by the PGW-Cs. In some implementations, the session database may be maintained locally by a device that manages the set of PGW-Cs.

PCRF 1008 may implement policy and charging rules functions, such as establishing QoS requirements, setting allowed bandwidth and/or data throughput limits for particular bearers and/or AMD 102, determining charges for a particular service for AMD 102, and/or other types of policy or charging rules.

HSS 1010 may store subscription information associated with AMDs 102 and/or information associated with users of AMDs 102. For example, HSS 1010 may store subscription profiles that include authentication, access, and/or authorization information. Each subscription profile may include information identifying AMD 102, authentication and/or authorization information for AMD 102, services enabled and/or authorized for AMD 102, device group membership information for AMD 102, and/or other types of information associated with AMD 102.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of actions associated with blocks have been described with reference to FIGS. 5, 6A, 6B, and 7, the order of the actions may be modified in other implementations. In addition, non-dependent actions may be performed in parallel and in different orders.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. An autonomous mobile device (AMD) comprising:
a processor configured to:
establish a Protocol Data Unit (PDU) session between the AMD and a Multi-Access Edge Computing (MEC) device that hosts an AMD controller in a cellular network, from the AMD to the AMD controller;
establish a Transmission Control Protocol Robot Operating System (TCPROS) connection, over the PDU session established between the AMD and the MEC device that hosts the AMD controller in the cellular network, from the AMD to the AMD controller; and
perform a mission in accordance with the mission plan while the AMD is connected to the AMD controller via the TCPROS connection, wherein when performing the mission, the processor is further configured to:
when the AMD loses the TCPROS connection to the AMD controller:
obtain disconnection information that includes a first snapshot of a current state of the AMD;
store the disconnection information within the AMD;
attempt to establish a second TCPROS connection from the AMD to the AMD controller;
when the attempt to establish the second TCPROS connection is successful, send the stored disconnection information to the AMD controller over the second TCPROS connection; and
when the attempt to establish the second TCPROS connection fails, cause the AMD to either move to a new location different from a current location of the AMD or halt the mission.

2. The AMD of claim 1, wherein the processor is further configured to:
receive the mission plan from the AMD controller over the TCPROS connection; and
store the mission plan in a memory.

3. The AMD of claim 1, wherein when the AMD loses the TCPROS connection to the AMD controller, the processor is further configured to:
retrace a travel path of the AMD to return to a previous checkpoint on the travel path.

4. The AMD of claim 3, wherein the new location includes another checkpoint that precedes the previous checkpoint on the travel path.

5. The AMD of claim 1, wherein when the attempt to establish the second TCPROS connection is successful, the processor is further configured to:
obtain a second snapshot of a current state of the AMD; and
when sending the disconnection information over the second TCPROS connection, send the second snapshot along with the disconnection information to the AMD controller over the second TCPROS connection.

6. The AMD of claim 5, wherein when the attempt to establish the second TCPROS connection is successful, the processor is further configured to:
after sending the disconnection information and the second snapshot, receive an updated mission plan from the AMD controller over the second TCPROS connection.

7. The AMD of claim 6, further comprising a memory that includes:
a map that indicates dead zones for the AMD to avoid in its travel paths.

8. The AMD of claim 7, wherein when receiving the updated mission plan, the processor is further configured to:
receive, over the second TCPROS connection, an updated map to replace the map.

9. The AMD of claim 1, further comprising a Robot Operating System (ROS).

10. The AMD of claim 1, wherein the MEC device includes a User Plane Function (UPF) that provides a termination point for the PDU session.

11. A method comprising:
establishing a Protocol Data Unit (PDU) session between an Autonomous Mobile Device (AMD) and a Multi-Access Edge Computing (MEC) device that hosts an AMD controller in a cellular network, from the AMD to the AMD controller;

establishing a Transmission Control Protocol Robot Operating System (TCPROS) connection, over the PDU session established between the AMD and the MEC device that hosts the AMD controller in the cellular network, from the AMD to the AMD controller; and performing a mission in accordance with a mission plan while the AMD is connected to the AMD controller via the TCPROS connection, wherein performing the mission comprises:

when the AMD loses the TCPROS connection to the AMD controller:

obtaining disconnection information that includes a first snapshot of a current state of the AMD;

storing the disconnection information within the AMD;

attempting to establish a second TCPROS connection from the AMD to the AMD controller;

when the attempt to establish the second TCPROS connection is successful, sending the stored disconnection information to the AMD controller over the second TCPROS connection; and when the attempt to establish the second TCPROS fails, causing the AMD to either move to a new location different from a current location of the AMD or halt the mission.

12. The method of claim 11, further comprising:

receiving the mission plan from the AMD controller over the TCPROS connection; and storing the mission plan in a memory.

13. The method of claim 11, further comprising:

when the AMD loses the TCPROS connection to the AMD controller, retracing a travel path of the AMD to return to a previous checkpoint on the travel path.

14. The method of claim 13, wherein the new location includes another checkpoint that precedes the previous checkpoint on the travel path.

15. The method of claim 11, further comprising:

when the attempt to establish the second TCPROS connection is successful:

obtaining a second snapshot of a current state of the AMD, wherein sending the disconnection information includes sending the second snapshot along with the disconnection information to the AMD controller over the second TCPROS connection.

16. The method of claim 15, further comprising:

when the attempt to establish the second TCPROS connection is successful, after sending the disconnection information and the second snapshot, receiving an updated mission plan from the AMD controller over the second TCPROS connection.

17. The method of claim 16, further comprising:

receiving, over the TCPROS connection, a map that indicates dead zones for the AMD to avoid in its travel paths, and storing the map in a memory.

18. The method of claim 17, wherein receiving the updated mission plan includes receiving, over the second TCPROS connection, an updated map to replace the map.

19. The method of claim 11, wherein the AMD controller comprises a Robot Operating System (ROS).

20. A non-transitory computer-readable medium comprising computer-executable instructions, which when executed by one or more processors included in an autonomous mobile device (AMD), cause the one or more processors to:

establish a Protocol Data Unit (PDU) session between the AMD and a Multi-Access Edge Computing (MEC) device that hosts an AMD controller in a cellular network, from the AMD to the AMD controller;

establish a Transmission Control Protocol Robot Operating System (TCPROS) connection, over the PDU session established between the AMD and the MEC device that hosts the AMD controller in the cellular network, from the AMD to the AMD controller; and perform a mission in accordance with a mission plan while the AMD is connected to the AMD controller via the TCPROS connection, wherein when performing the mission, the one or more processors are further to:

when the AMD loses the TCPROS connection to the AMD controller:

obtain disconnection information that includes a first snapshot of a current state of the AMD;

store the disconnection information within the AMD;

attempt to establish a second TCPROS connection from the AMD to the AMD controller;

when the attempt to establish the second TCPROS connection is successful, send the stored disconnection information to the AMD controller over the second TCPROS connection; and when the attempt to establish the second TCPROS connection fails, cause the AMD to either move to a new location different from a current location of the AMD or halt the mission.

* * * * *